G. B. SWAINSON.
BICYCLE DRIVING AND BRAKE MECHANISM.
APPLICATION FILED DEC. 17, 1914. RENEWED APR. 22, 1916.
1,206,941.
Patented Dec. 5, 1916.
2 SHEETS—SHEET 1.
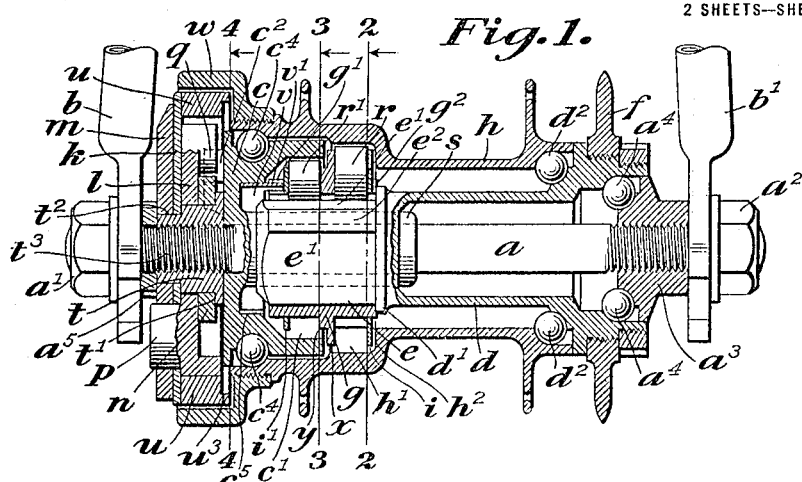
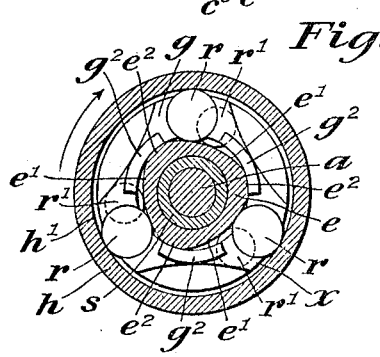
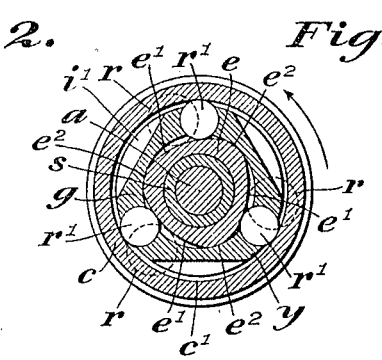
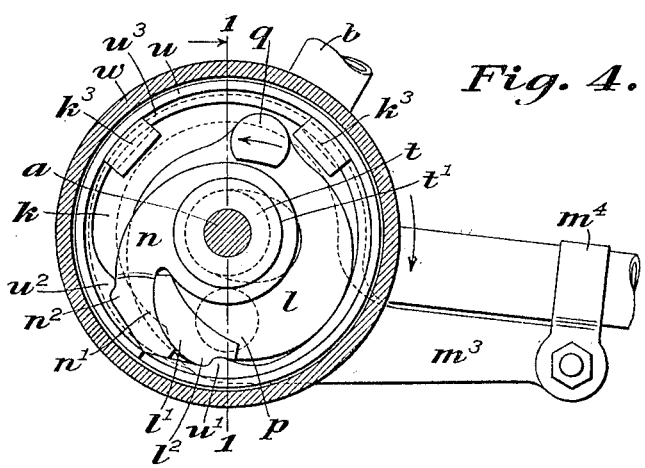
WITNESSES:
INVENTOR.
George B. Swainson
BY
ATTORNEYS.

G. B. SWAINSON.
BICYCLE DRIVING AND BRAKE MECHANISM.
APPLICATION FILED DEC. 17, 1914. RENEWED APR. 22, 1916.
1,206,941.
Patented Dec. 5, 1916.
2 SHEETS—SHEET 2.
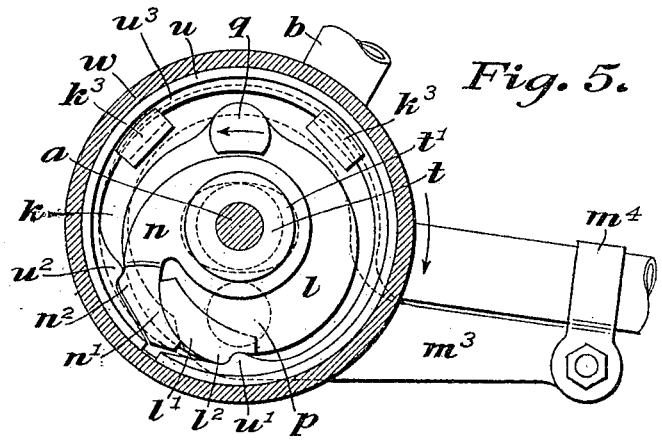
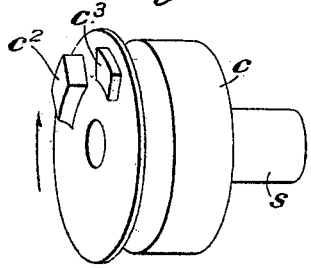
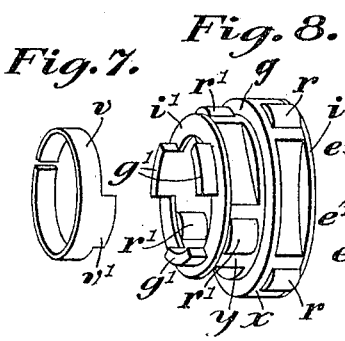
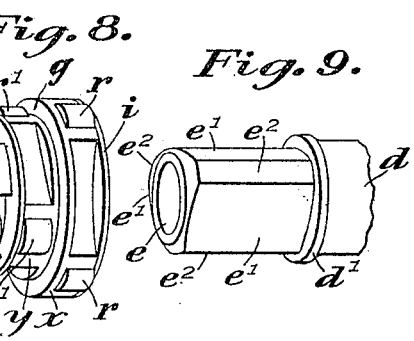
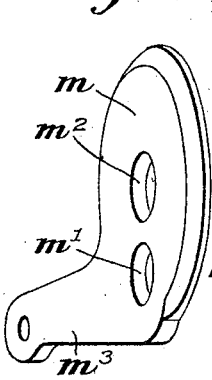
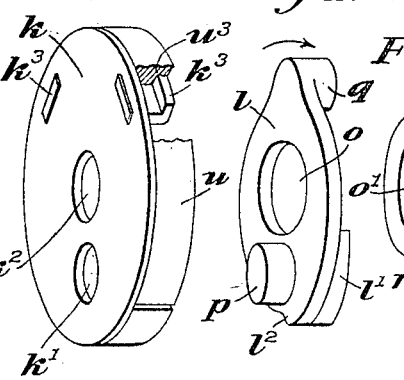
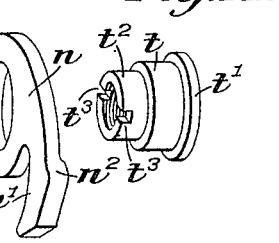
WITNESSES:
INVENTOR.
George B. Swainson
BY
ATTORNEYS.

UNITED STATES PATENT OFFICE.

GEORGE B. SWAINSON, OF SCRANTON, PENNSYLVANIA.

BICYCLE DRIVING AND BRAKE MECHANISM.

1,206,941.  Specification of Letters Patent.  Patented Dec. 5, 1916.

Application filed December 17, 1914, Serial No. 877,766. Renewed April 22, 1916. Serial No. 93,022.

*To all whom it may concern:*

Be it known that I, GEORGE B. SWAINSON, a citizen of the United States, and a resident of Scranton, in the county of Lackawanna and State of Pennsylvania, have invented a new and Improved Bicycle Driving and Brake Mechanism, of which the following is a full, clear, and exact description.

The purpose of the present invention is to provide in the driving hub of a bicycle an improved mechanism by which the rider may propel the machine, allow it to coast, or control its momentum at will, and among the principal objects which the invention has in view, are: to provide quick acting means for transference of the mechanism from a driving to a braking condition; to provide a brake ring of the expansion type adapted to present a maximum friction surface; to improve the mechanism employed for expanding the brake ring; and to obtain increased efficiency by means of the mechanism, embodying the invention.

*Drawings.*—Figure 1 is a longitudinal section of a bicycle driving wheel hub, constructed and arranged in accordance with the present invention, the section being taken as on the line 1—1 in Fig. 4; Fig. 2 is a cross section taken as on the line 2—2 in Fig. 1 of the drawings, showing an end view of the roller cage disclosing the driving clutch rollers in their operative or driving position and indicating the brake-clutch rollers in their released position; Fig. 3 is a cross section taken as on the line 3—3 in Fig. 1 of the drawings, showing the brake clutch rollers in operative engagement and indicating the relative position of the released driving clutch rollers; Fig. 4 is a cross section taken as on the line 4—4 in Fig. 1, showing in elevation, the brake mechanism with the brake ring expanding elements in their contracted or brake-released position; Fig. 5 is a similar view showing in expanded or brake-setting position the brake ring and controlling parts thereof; Figs. 6, 7, 8 and 9 are detail views of the parts of the driving and brake clutch members in perspective and separated in line to show their relative assembling arrangement; and Figs. 10, 11, 12, 13 and 14 are detail views in perspective, showing the elements forming the brake anchor and brake mechanism, with the members disposed in line and in the order of assemblage.

*Description.*—As seen in Fig. 1 of the accompanying drawings, an axle $a$ is secured to a frame $b$, $b^1$ in the conventional manner by locking the rear ends of the frame between the nuts $a^1$, $a^2$ and the bearing adjusting members $a^3$ and $a^5$. The cone $a^3$ is shaped to form a race for the balls $a^4$ provided to support the outer end of the driving sleeve $d$. The sleeve $d$ is shaped to form a race for the balls $d^2$ of the bearing at one end of the wheel hub $h$. The other end of the hub has a bearing upon the balls $c^1$, which have a race formed in the periphery of the member $c$.

The driving sleeve $d$ is directly and rigidly connected with a sprocket wheel $f$ and is supported at the inner end on the central sleeve $s$ of the brake actuator $c$, which is smooth bored to freely fit the axle $a$, as shown in Figs. 1, 2 and 3 of the drawings. The central sleeve $s$ forms a journal bearing for the triple cam surfaced extension $e$ of the driving sleeve $d$. The extension is best seen in Fig. 9 of the drawings. The cam surfaces $e^1$ thereof are of equal length and are spaced apart by the relatively narrow bearing surfaces $e^2$, as shown in the transverse sections in Figs. 2 and 3. The extension $e$ carries the roller cage $g$, which is supported concentric thereto by the bearing surfaces $e^2$. The cage $g$ is loosely mounted on the said bearing surfaces, and is capable of an oscillating rotative movement thereon about the extension $e$ as hereinafter described. A thrust collar $d^1$ is provided on the driving sleeve $d$ to dispose the cage $g$ closely to, but out of contact with the wall $h^2$ of the hub, the cage being maintained against the said collar by the ring $v$.

It will be understood that the driving sleeve $d$ being rigidly connected with the sprocket wheel $f$, the rotation of the said sprocket wheel or other equivalent driving member, rotates the said driving sleeve and the extension $e$ thereof relative to the cage $g$ and to the driving rollers $r$ and braking rollers $r^1$ loosely contained in pockets in a major drum section $x$ and a minor drum section $y$, with which the said cage is provided, and as best seen in Fig. 8 of the drawings. The driving or braking operations for the bicycle are dependent upon the engagement of the rollers $r$ or $r^1$ by the cam surface $e^1$ of the extension $e$.

The cage $g$ is provided with keeper rings $i$ and $i^1$, which close the ends of the pockets provided for the rollers $r$ and $r^1$. The rings are recessed to receive, and held in place by the lugs $g^1$ and $g^2$. The lugs $g^1$ are extended and spaced apart to form recesses, into which fits when assembled a key lug $v^1$ of the spring slip ring or controller $v$ as seen in Figs. 7 and 8. The cage is shown, in Fig. 2, with the keeper ring $i$ as removed to show the rollers $r$ in the pockets.

The driving rollers $r$ and the braking rollers $r^1$ are disposed in progressive relation substantially as shown in Figs. 2, 3 and 8 of the drawings. The normal disposition of the rollers $r$ and $r^1$ is that in which they are arranged in two series and harnessed in pairs and in which each pair rests upon one of the cam surfaces $e^1$, between the bearing surfaces $e^2$ of the extension $e$. Due to this arrangement, it will be seen that if the cage $g$ is maintained relatively stationary, the movement of the driving sleeve $d$ and extension $e$ thereon, forwardly or backwardly, results in lifting one or other series of the rollers to engage either of the adjacent structures.

From the foregoing and by reference to the drawings, particularly to Figs. 2 and 3 thereof, it will be seen that the shift of the rollers $r$ and $r^1$ is effected rapidly and without conflict, due to the fact that the movement which engages the one set of rollers, is the movement which disengages the other set of rollers. Thus in Figs. 2 and 3 of the drawings, the arrows shown therein indicate the movements of the extension $e$ for the accomplishment of the results required.

Disposed in juxtaposed and circumfolding relation to the major drum section $x$ of the cage $g$, is a shallow cylindrical clutch socket $h^1$ formed in the hub $h$. The inner surface of the socket $h^1$ is closely juxtaposed to the perimeter of the rollers $r$, when the same rest on the center of the cam surfaces $e^1$ of the extension $e$. The separation between the rollers $r$ and the surface of the socket $h^1$, is sufficient to permit the hub $h$ to rotate freely when the said socket is not gripped by the rollers $r$, as seen in Fig. 1.

To surround the rollers $r^1$ in a similar manner to that above described with regard to rollers $r$, the brake actuator $c$ is provided with a cylindrical clutch socket $c^1$, the inner wall of which is normally removed from engaging contact with the rollers $r^1$ when the driving sleeve $d$ is being employed to drive the bicycle. When, however, the sleeve $d$ is rotated reversely as by back pedaling, the cam surfaces $e^1$ of the extension $e$, permit the retraction of the rollers $r$ and project the rollers $r^1$ to frictionally engage the clutch surface of socket $c^1$ of the brake actuator $c$.

The cage $g$ is normally frictionally connected with the brake actuator $c$ through the agency of the slip ring or controller $v$. The engagement of the key lug $v^1$ with the lugs $g^1$ on the cage $g$ has been described. The body of the controller $v$ rests in a relatively reduced socket $c^5$ formed in the actuator $c$ and opening into the clutch socket $c^1$. The controller $v$ frictionally engages the surface of the smaller socket to form a retarding, yielding connection between the cage $g$ and the actuator $c$. This connection provides for a relatively free movement of the sleeve $d$, without movement on the part of the cage $g$, until the driving rollers $r$ or the brake rollers $r^1$ grip the clutch sockets in the manner as above described. Thus when the clutching action is effected by the forward rotation of the driving sleeve for the propulsion of the bicycle, the cage, rotating with the driving sleeve and the hub, rotates the controller $v$ in its socket within the actuator $c$. When however, the reverse operation is effected for the purpose of applying the brake, the ring $v$ turns as a unit with the actuator, cage and driving sleeve.

The brake mechanism, as shown in Fig. 4 comprises an expansion brake ring, and two pivotally mounted inter-acting levers of peculiar form. The function of these levers is to produce an opening movement to both ends of the brake ring simultaneously in opposite directions. The link-shaped lever $l$ is pivotally mounted by the fulcrum post $p$ upon the keeper plate $k$. The keeper plate $k$ has a perforation $k^1$ to receive the post $p$. An anchor plate $m$ has a similar perforation $m^1$, through which the said post extends and has its bearing, as seen in Fig. 1 of the drawings but more clearly shown in Figs. 10, 11 and 12. The keeper plate $k$ has a central perforation $k^2$, through which the reduced end $t^2$ of a thimble $t$ extends. The perforation $m^2$ in the plate $m$ is similarly provided to receive the reduced end $t^2$ of the thimble $t$. The anchor plate $m$ is provided with an anchor arm $m^3$ adapted to be secured definitely to the frame of the bicycle as by the clip $m^4$, thereby holding the plates $k$ and $m$ stationary or non-rotative and fixing the bearing of the fulcrum post $p$, which is the pivot for the lever $l$. The short end of the lever $l$ is provided with a laterally extended cam $l^1$. The cam $l^1$ is provided at the heel thereof with a shoulder $l^2$ to engage an inset shoulder $u^1$ on the brake ring $u$ as seen in Fig. 4 of the drawings.

The lever $l$ has a laterally projecting pin $q$ at the opposite side of an enlarged opening $o$, provided in the center of the platelike body of the lever, as best seen in Fig. 12 of the drawings. The pin $q$ normally rests between and in engagement with the lug $c^2$ and the lug $c^3$ on the brake actuator $c$, as seen in Figs. 6 and 12. The actuator $c$ is rotatively mounted on the axle $a$ by means of the central sleeve $s$ thereof. The rotation of the said actuator is limited, being governed by the throw of the lever $l$, the enlarged opening $o$ permitting the movement of the said lever about the thimble $t$.

Superimposed upon the lever $l$ and disposed closely thereto is a secondary lever $n$. The lever $n$ is provided with an eye or opening $o^1$ which forms a bearing on the thimble $t$, adapting the said lever $n$ to swing thereon, as seen in Figs. 13 and 14. The lever $n$ has a cam $n^1$ which is curved to lie against the aforesaid laterally projecting cam $l^1$ of the lever $l$. A shoulder $n^2$ is formed on the cam $n^1$ which engages the inset shoulder $u^2$ of the brake ring $u$. The thimble $t$ has a collar $t^1$ which serves to maintain the lever $l$ and the lever $n$ in close but free relation to each other and to the keeper plate $k$. By this arrangement the lever $l$ freely moves between the keeper plate $k$ and the lever $n$, while the said lever $n$ is free to swing upon the thimble $t$ between the lever $l$ and the collar $t^1$.

The cams $l^1$ and $n^1$ on the lever $l$ and the lever $n$, are disposed in the relation, shown best in Fig. 4 of the drawings. The convex face of the cam $l^1$ and the concave face of the cam $n^1$, are arranged to an eccentric curve, formed by the gradual extension of the toe of the cam $l^1$ and the recession of the cam $n^1$. The eccentric curve of the cam surfaces is so disposed with reference to the axes about which the levers rotate or swing, that the symmetrical relation of the said cams to each other is maintained without regard to the movements of the said levers.

From the foregoing, and by reference to the drawings shown in Figs. 4 and 5, it will be evident that any movement imparted to the lever $l$ and thence to its shoulder $l^2$, will, through the operation of the cam $l^1$ upon the cam $n^1$, cause a simultaneous opposite movement to be imparted to the lever $n$ and the shoulder $n^2$ thereof, forced thereto by the engaged eccentric surfaces of the two cams. Thus it will be seen that when, by the back pedaling effort, the brake actuator is rotated in the direction of the arrow in Fig. 6, that the lug $c^2$ is caused to impinge against the pin $q$ of the lever $l$, moving the said lever about its fulcrum post $p$. The result of this action is that the shoulders $l^2$ and $n^2$ on the levers, together with the inset shoulders $u^1$ and $u^2$ on the brake ring are forced apart, expanding the brake ring outwardly against the brake drum $w$, as shown in Fig. 5, where the action of the cams consequent upon the movement of the lever $l$ for the brake application is seen. The brake drum $w$ being rigidly connected with the hub $h$, and the ring $u$ being non-rotatively held and in rubbing contact with the said drum, the wheel, of which the hub $h$ is a part, is retarded by the braking action which ensues between the brake ring and the brake drum. When the brake ring is in frictional contact with the rotating brake drum, the inset shoulder $u^1$ of the said ring impinges against the shoulder $l^2$ of the lever $l$, which having a fixed bearing by means of the post $p$, the ring is held against rotation with the drum. The impinging force of the ring against the shoulder $l^2$ is equalized by the opposing or rearward thrust of the actuator against the pin $q$, which may be graduated as the braking friction is required. When desired to release the brake, the driving sleeve $d$ is rotated in a forward direction, when the extension $e$ and the surfaces $e^1$ thereof are readjusted with reference to the rollers $r^1$, the pressure of which is relieved on the inner surface of the clutch socket $c^1$ and the brake ring $u$ is then permitted to contract, moving the levers $l$ and $n$ to their normal positions, which is that shown in Fig. 4 of the drawings. Coincident with the shift of the lever $l$ and the pin $q$ thereof, the actuator $c$ and the lugs connected therewith, are moved back to their initial or normal location.

The hub is provided with an enlargement or bell, which forms the driving clutch socket for the driving rollers. The driving rollers are preferably made of larger diameter than the braking rollers to withstand the more intermittent use they are subjected to in driving. Their large diameter presents a maximum gripping surface, eliminating wear on the cams and rendering the drive positive and smooth. The rollers, being arranged in triangular formation, their gripping action is equalized and self-centering both in driving and braking.

The bearings of the hub and driving sleeve may be adjusted by means of the cone $a^3$ in the usual way or by the thimble $t$. The thimble is threaded on the axle and abuts against the actuator $c$, and has notches $t^3$ formed to receive lugs on the adjusting ring $a^5$ by which the adjustment of the thimble is made.

The brake ring $u$ is split and set to normally contract to a lesser diameter than that of the drum $w$. The ring is held freely, being loosely supported by bracket hooks $k^3$. The hooks $k^3$ are riveted or otherwise rigidly secured in the plate $k$ and the ring $u$ has a rabbeted edge $u^3$ to receive the upturned ends of the hooks $k^3$, as best shown in Fig. 11 of the drawings. By rabbeting the edge of the ring $u$, a maximum friction surface for the said ring against the inner surface of the drum $w$ is secured. The brake ring is preferably made as shown in the drawings to insure a graduated elasticity, that it may be expanded without distortion and its circularity maintained, thus eliminating excessive strains and undue wear in the bearings and frictional parts. The ring being made a complete circle, and having no part thereof anchored to a fixed abutment, its entire circumferential length is available for the braking effect, thereby increasing the efficiency and durability of the mechanism.

Claims:

1. A mechanism as characterized comprising, a plurality of driven members, each having a clutch socket concentrically disposed; a rotary driving member having a cam surface disposed in said sockets; a plurality of loose grip members between said driving member and said clutch sockets, said grip members being progressively disposed; means for maintaining the progressive arrangement of said grip members; a brake, embodying a drum member mounted on one of said driven members and an expansible brake ring mounted within said drum member; and means operatively engaging said ring and the other of said driven members for expanding the said ring.

2. A mechanism as characterized comprising, a plurality of driven members, each having a clutch socket concentrically disposed; a rotary driving member having a cam surface disposed in said sockets; a plurality of grip members between said driving member and said clutch sockets, said grip members being progressively disposed; means for maintaining the progressive arrangement of said grip members; a brake, embodying a drum member mounted on one of said driven members and an expansible brake ring mounted within said drum member; means operatively engaging said ring and the other of said driven members for expanding the said ring; and means for holding said ring against rotation.

3. A mechanism as characterized comprising, a plurality of driven members, each having a clutch socket concentrically disposed; a rotary driving member having a cam surface disposed within said sockets; a plurality of grip members between said driving member and said clutch sockets, said grip members being progressively disposed; means for maintaining the progressive arrangement of said grip members; a brake, embodying a drum member mounted on one of said driven members and an expansible brake ring mounted within said drum member; a plurality of pivotally mounted levers operatively engaging said ring; means operatively connecting said levers for moving the same in relatively opposite directions, to expand said ring; and means operatively connecting one of said levers and the other of said driven members.

4. A mechanism as characterized comprising, a plurality of driven members, each having a clutch socket concentrically disposed; a rotary driving member having a cam surface disposed in said sockets; a plurality of grip members between said driving member and said clutch sockets, said grip members being progressively disposed; means for maintaining the progressive arrangement of said grip members; a brake, embodying a drum member mounted on one of said driven members and an expansible brake ring mounted within said drum member; a plurality of interacting levers, each operatively connecting a section of said ring for movement thereof in relatively opposite directions; means operatively connecting said interacting levers for separating the ends thereof engaged with said ring; and means operatively connecting one of said levers and the other of said driven members.

5. A mechanism as characterized comprising, a plurality of driven members, each having a clutch socket concentrically disposed; a rotary driving member having a cam surface disposed in said sockets; a plurality of grip members between said driving member and said sockets, said grip members being progressively disposed; means for maintaining the progressive arrangement of said grip members; a brake, embodying a drum member mounted on one of said driven members and a freely expansible brake ring mounted within said drum member; a plurality of interacting levers, each operatively connecting a section of said ring for movement thereof in relatively opposite directions; a plurality of cam surfaced members, one formed on each of said levers coöperative to move in opposite directions the portion of said levers connected with said ring; and means operatively connecting one of said levers and the other of said driven members.

6. A mechanism as characterized comprising, a plurality of driven members, each having a clutch socket concentrically disposed; a rotary driving member having a cam surface disposed within said sockets; a plurality of grip members between said driving member and said socket, said grip members being progressively disposed; means for maintaining the progressive arrangement of said grip members; a brake, embodying a drum member mounted on one of said driven members; an expansible brake ring mounted in said drum member; a plurality of pivotally mounted interacting levers, said levers having each a cam, said cams being operatively engaged for simultaneous movement in relatively opposite directions; means connecting said cams and separable sections of said ring; and means operatively engaging one of said levers and the other of said driven members for expanding said ring when said driven member is actively disposed.

7. A mechanism as characterized comprising, a plurality of driven members, each having a clutch socket concentrically disposed; a rotary driving member having a cam surface disposed in said sockets; a plurality of grip members between said driving member and said clutch sockets, said grip members being progressively disposed; means for maintaining the progressive arrangement of said grip members; a brake, embodying a drum member mounted on one of said driven members; an expansible brake ring mounted within said drum member; a plurality of pivotally mounted interacting levers, said levers having each a cam, said cams being operatively engaged for simultaneous movement in relatively opposite directions; means connecting said cams and separable sections of said ring; a pivot for one of said levers, said pivot being disposed in correspondence with said cams; means operatively connecting the last-mentioned lever with the other of said driven members; and means to operatively maintain the said pivot in stationary relation to the said driven members.

8. A mechanism as characterized comprising, a plurality of driven members, each having a clutch socket concentrically disposed; a rotary driving member having a cam surface disposed within said sockets; a plurality of grip members between said driving member and said sockets, said grip members being progressively disposed; means for maintaining the progressive arrangement of said grip members; a brake, embodying a drum member mounted on one of said driven members; an expansible brake ring mounted within said drum member; a plurality of pivotally mounted interacting levers, said levers having each a cam, said cams being operatively engaged for simultaneous movement in relatively opposite directions; means connecting said cams and separable sections of said ring; a pivot for one of said levers, said pivot being disposed in correspondence with said cams; a connecting extension formed on the last-mentioned lever disposed in the path of, to be engaged by projections formed on the other of said driven members; and an anchored member to operatively engage the said pivot to form a stationarily disposed bearing therefor.

9. A mechanism as characterized comprising, a plurality of driven members, each having a clutch socket concentrically disposed; a rotary driving member having a cam surface disposed within said sockets; a plurality of grip members between said driving member and said sockets, said grip members being progressively disposed; means for maintaining the progressive arrangement of said grip members; a brake, embodying a drum member mounted on one of said driven members; an expansible brake ring mounted within said drum member; a plurality of pivotally mounted interacting levers, said levers having each a cam, said cams being operatively engaged for simultaneous movement in relatively opposite directions; means connecting said cams and separable sections of said ring; a pivot for one of said levers, said pivot being disposed in correspondence with said cams; a connecting extension formed on the last-mentioned lever disposed in the path of, to be engaged by projections formed on the other of said driven members; and an anchor plate operatively engaging said pivot to maintain fixedly the pivotal axis thereof.

10. A mechanism as characterized comprising, a wheel hub having a clutch socket; an actuator having a clutch socket concentric with said hub; a rotary driving member having cam surfaces disposed within said sockets; a plurality of grip members disposed between said sockets and said cam surfaces, said grip members being disposed in progressive relation; a cage holding said grip members in spaced relation; and means frictionally engaging said cage and actuator for holding said cage while said grip members are adjusted by said cam surfaces.

11. A mechanism as characterized comprising, a wheel hub having a clutch socket; an actuator having a clutch socket concentric with said hub; a rotary driving member having cam surfaces disposed within said sockets; a plurality of grip members disposed between said sockets and said cam surfaces, said grip members being disposed in progressive relation; a cage holding said grip members in spaced relation; and a controller for said cage having a split ring friction portion to hold said cage while shifting the said grip members.

12. A mechanism as characterized comprising, a multi-clutch member having a plurality of expansible grip members disposed in series, each series embodying more than two members for balancing the thrust thereof, the members of one series being progressively advanced with relation to the members of the other series; and a manually controlled driving member having cam surfaces equal in number to the grip members of one series, said surfaces being each disposed in juxtaposed relation to two grip members belonging to different series.

13. A mechanism as characterized comprising, a plurality of clutch-socket-provided driven members; a rotary manually controlled driving member; and a plurality of series of expansible grip members disposed between said driven members and driving member, the grip members of the opposite series being relatively staggered for alternate operation by said driving member when rotated in relatively reverse direction.

14. A mechanism as characterized comprising, a plurality of clutch-socket-provided driven members; a rotary manually controlled driving member; a plurality of series of expansible grip members disposed between said driven members and driving member, the grip members of the opposite series being staggered for alternate operation by said driving member when rotated in relatively reverse direction; and means for limiting the extent of rotation of one of said driven members.

In testimony whereof I have signed my name to this specification in the presence of two subscribing witnesses.

GEORGE B. SWAINSON.

Witnesses:
 FLORENCE A. RICHARDS,
 GEO. H. SMITH.

Copies of this patent may be obtained for five cents each, by addressing the "Commissioner of Patents, Washington, D. C."